US012117151B1

(12) United States Patent
Wu et al.

(10) Patent No.: US 12,117,151 B1
(45) Date of Patent: Oct. 15, 2024

(54) CONNECTING ASSEMBLY FOR LIGHT STRIP AND LIGHT STRIP WITH IT

(71) Applicant: Signcomplex Limited, Shenzhen (CN)

(72) Inventors: Tiejun Wu, Shenzhen (CN); Hailong Zhu, Shenzhen (CN); Ji'an Wei, Shenzhen (CN); Wenhai Liu, Shenzhen (CN); Wenmao Wei, Shenzhen (CN); Yongbo Zhu, Shenzhen (CN)

( * ) Notice: Subject to any disclaimer, the term of this patent is extended or adjusted under 35 U.S.C. 154(b) by 0 days.

(21) Appl. No.: 18/401,646

(22) Filed: Jan. 1, 2024

(30) Foreign Application Priority Data

Sep. 27, 2023 (CN) ......................... 202322668262.2

(51) Int. Cl.
*F21V 23/06* (2006.01)
*F21S 4/28* (2016.01)
*F21V 21/002* (2006.01)
*F21V 21/005* (2006.01)
*F21Y 103/20* (2016.01)

(52) U.S. Cl.
CPC ................ *F21V 23/06* (2013.01); *F21S 4/28* (2016.01); *F21V 21/002* (2013.01); *F21V 21/005* (2013.01); *F21Y 2103/20* (2016.08)

(58) Field of Classification Search
CPC ......... F21Y 2103/20; F21S 4/28; F21S 2/005; F21C 21/005; F21C 21/002; F21V 23/06
See application file for complete search history.

(56) References Cited

U.S. PATENT DOCUMENTS

| | | | | |
|---|---|---|---|---|
| 9,543,699 | B1 * | 1/2017 | Wang | H01R 13/521 |
| 2017/0122507 | A1 * | 5/2017 | Hoffman | F21V 21/005 |
| 2018/0299082 | A1 * | 10/2018 | Li | F21V 15/01 |

FOREIGN PATENT DOCUMENTS

TW M524581 U * 6/2016

OTHER PUBLICATIONS

IInnovation Q+ NPL Search (Year: 2024).*

* cited by examiner

*Primary Examiner* — Anabel Ton

(57) ABSTRACT

A connecting assembly for light strip and a light strip with it are provided. The connecting assembly for light strip comprises: a connecting plug having a first hole suitable for a shape of a light strip for connecting the light strip; a connector, having a connector housing detachably connectable to the connecting plug, and a conducting needle that pierces the light strip and realizes an electrical connection with the light strip. The connection method of a conducting needle piercing into a light strip to realize the circuit connection between the light strips provided in the present disclosure is more convenient to use; the method of a connecting plug firstly connecting the light strip and then connecting to the connector makes the overall connection more solid, and the connection method is easier, and the shapes of the connecting plug and the connector are similar to that of the light strip, so as to make the light strip after connection more integral.

12 Claims, 6 Drawing Sheets

CONNECTING ASSEMBLY FOR LIGHT STRIP AND LIGHT STRIP WITH IT

TECHNICAL FIELD OF THE INVENTION

The present disclosure relates to the technical field of light strip (or lamp strip), in particular to a connecting assembly for light strip and a light strip with it.

BACKGROUND OF THE INVENTION

As a new type of lighting equipment, the light strip is gradually being widely used for its softness, elasticity, durability, waterproof and dustproof features. The length of the light strip is limited, in the actual use of the scene, it is necessary to connect multiple light strips, however, the circuit connection between the light strips is inconvenient, it is necessary to insert the power cord into the power supply jack to realize it, in order to realize the connection is more solid, usually also adopt the way of fastening or screwing connector to realize the connection of the mechanical structure and the circuit, the above mentioned way of connecting light strips destroys the one-piece appearance of the strip, and there is also the problem of uneven luminous emission.

SUMMARY OF THE INVENTION

Based on this, in order to solve at least one of the above problems mentioned in the background, the present disclosure provides a connecting assembly for light strip and a light strip thereof.

The specific technical solution is as follows: according to an aspect of the present disclosure, there is provided a connecting assembly for light strip comprising:

A connecting plug having a first hole suitable for the shape of a light strip for connecting the light strip;

A connector, having a connector housing detachably connectable to the connecting plug, and a conducting needle that pierces the light strip and realizes an electrical connection with the light strip;

A conducting wire, connected to a power source to realize power supply to the light strip;

Wherein one end of the connector is used to be connected with the light strip by means of the conducting needle piercing the connecting plug, and another end of the connector is connected to the conducting wire to realize power supply of the light strip.

Preferably, it further comprises: a spacer having a shape matching the cavity in which a lamp bead of the light strip is located for supporting a circuit board in the light strip.

Preferably, an outer surface of the connecting plug has a connection structure matching the connector housing;

and/or, the back surface of the connecting plug is provided with a third hole connected to the first hole, the third hole being used for the passage of a conducting needle.

Preferably, the connection structure on the outer surface of the connecting plug is a protrusion, the protrusion is matched with a groove provided in the connector housing to realize a detachable connection between the connecting plug and the connector;

or, the connection structure on the outer surface of the connecting plug is a groove, the groove is matched with a protrusion provided on the side face of the connector housing to realize a detachable connection of the connecting plug with the connector.

Preferably, the connector housing has a bottom surface and the conducting needle is fixedly connected to the bottom surface.

Preferably, the connector housing has two side faces set opposite to each other, and two grooves set on the side faces match with two protrusions set on the outer surface of the connecting plug to realize the detachable connection between the connecting plug and the connector;

or, the connector housing has two side faces set opposite to each other, two protrusions set on the side faces matching two grooves set on the outer surface of the connecting plug to realize the detachable connection between the connecting plug and the connector.

Preferably, the conducting needle pierces into and presses against a pad on a circuit board on a light strip inserted the first hole through the connecting plug to achieve the electrical connection;

or, the conducting needle pierces into a circuit board on a first light strip inserted into the first hole through a first connecting plug to achieve the electrical connection.

According to another aspect of the present disclosure, there is provided a connecting assembly for light strip comprising:

A connecting plug having a first hole that fits a shape of a light strip for connecting the light strip;

A first connector and a second connector, both having a connector housing detachably connectable to the connecting plug, and a conducting needle for piercing the light strip and realizing an electrical connection with the light strip;

A conducting wires for electrically connecting the first connector and second connector;

wherein one ends of the first connector and the second connector are used to be connected with the light strip by means of the conducting needle piercing the connecting plug respectively, and another ends of the first connector and the second connector are connected to each other by the conducting wire to realize an electrical connection between two light strips.

According to another aspect of the present disclosure, there is provided a connecting assembly for light strip comprising:

a first connecting plug having a first hole suitable for a shape of a light strip for connecting a first light strip;

a second connecting plug having a second hole adapted to a shape of the light strip for connecting a second light strip;

a connector, having a connector housing detachably connecting the first connecting plug and the second connecting plug, and a first conducting needle and a second conducting needle piercing the first light strip and second light strip and realizing an electrical connection with the first light strip and second light strip.

Preferably, it further comprises: a first spacer and a second spacer; the first spacer and the second spacer both have a shape that matches a shape of a cavity in which the lamp beads of the first light strip and the second light strip are located, for supporting a circuit board in the light strips.

Preferably, the first conducting needle pierces into a circuit board on the first light strip inserted in the first hole through a first connecting plug to achieve an electrical connection;

and/or, the second conducting needle pierces into a circuit board on the second light strip inserted in the second hole through a second connecting plug to achieve an electrical connection.

Preferably, the first conducting needle pierces into and presses against a pad on a circuit board on the first light strip inserted in the first hole through a first connecting plug to achieve an electrical connection;

and/or, the second conducting needle pierces into and presses against a pad on a circuit board on the second light strip inserted in the second hole through a second connecting plug to achieve an electrical connection.

According to another aspect of the present disclosure, there is provided a light strip in which a connection is realized using the connecting assembly for light strip as described above.

Relative to the prior art, the present disclosure has the following beneficial effects:

1) The connection method of a conducting needle piercing into a light strip to realize the circuit connection between the light strips is more convenient to use;
2) The method of a connecting plug firstly connecting the light strip and then connecting to the connector is more solid, the connection method is easier, and the shape of the connecting plug and the connector can be selected to be similar to that of the light strip, so as to make the light strip after connection more integral;
(3) The light strip is inserted into the connecting plug, which can be transparent or has the same color as the light strip, so that the light emitting is more uniform;
(4) the conducting needle in the connector pierces the circuit board in the light strip, such as the flexible circuit board, to achieve electrical connection or holds against a PCB pad to achieve electrical connection, so that it can achieve solderless or solder-free conductivity, because the piercing of the light strip colloid is equivalent to the realization of the conducting needle fixed, it avoids false welding at the same time but also improves the solidity of the electrical connection.

BRIEF DESCRIPTION OF THE DRAWINGS

The present disclosure can be further understood from the following description in conjunction with the accompanying drawings. The parts in the drawings are not necessarily drawn to scale, but rather the emphasis is placed on the principles of the illustrated embodiments. In different views, the same accompanying drawing reference signs designate corresponding parts.

DETAILED DESCRIPTION OF THE PREFERRED EMBODIMENT

The present disclosure is described below based on embodiments, but it is worth stating that the present disclosure is not limited to these embodiments. In the following detailed description of the present disclosure, some specific detailed portions are exhaustively described. However, the present disclosure can also be fully understood by a person skilled in the art with respect to the parts that are not exhaustively described.

In addition, persons of ordinary skill in the art should understand that the accompanying drawings are provided only to illustrate the purposes, features, and advantages of the present disclosure, and the accompanying drawings are not actually drawn to scale.

At the same time, unless the context clearly requires otherwise, the words “including”, “comprising”, and the like throughout the specification and the claims should be interpreted to mean inclusive rather than exclusive or exhaustive; that is to say, it means “including but not limited to”.

Embodiment 1

Figure 1:
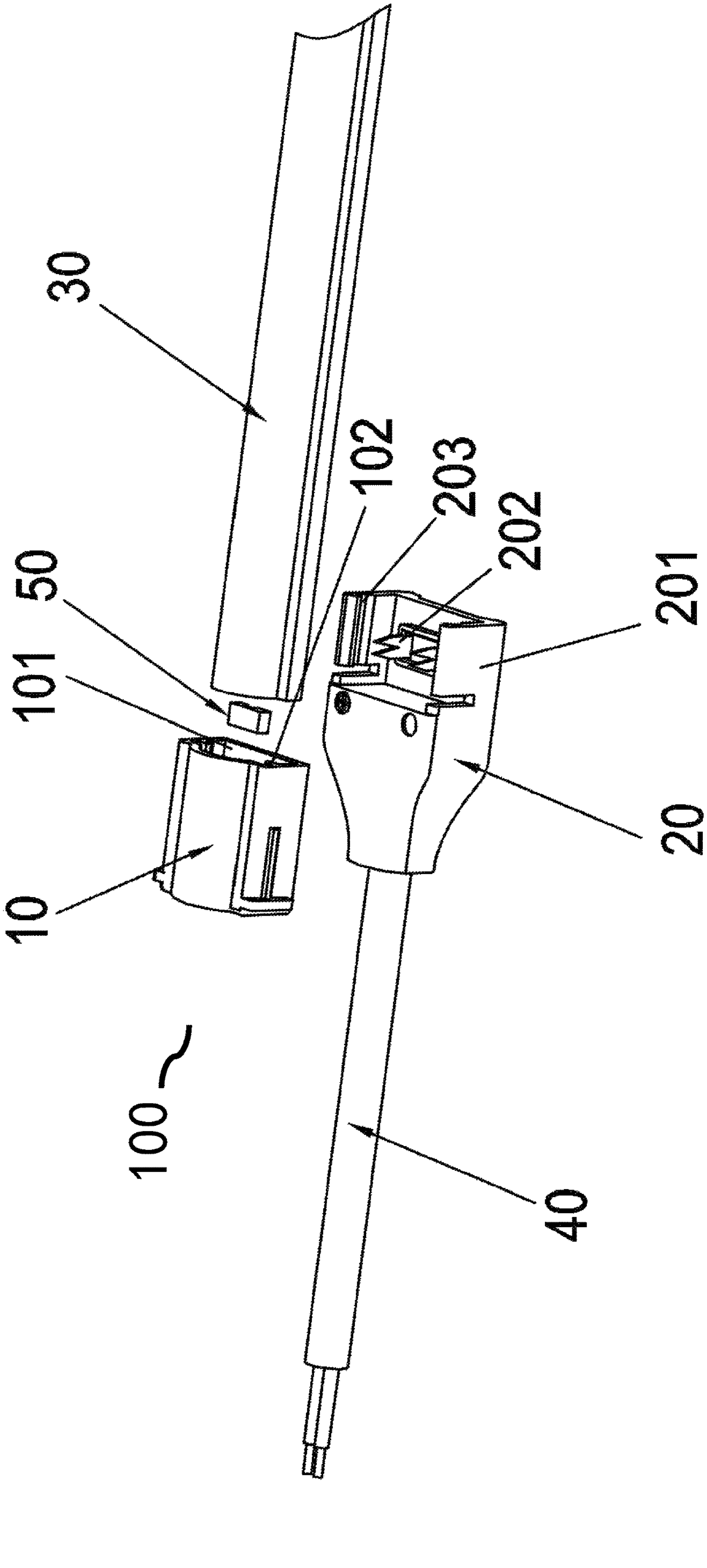
FIG. 1 is a schematic view of a structure of a connecting assembly for light strip 100 of embodiment 1 of the present disclosure.

As shown in FIG. 1, the connecting assembly for light strip 100 comprises:

A connecting plug 10, which has a first hole 101 that fits the shape of the light strip for connecting the light strip 30;

a connector 20, which has a connector housing 201 detachably connectable to the connecting plug 10 and a conducting needle 202 that pierces the light strip 30 and realizes an electrical connection with the light strip 30;

A conducting wire 40, connected to a power source for powering the light strip 30;

Wherein one end of the connector 20 is used to be connected with the light strip by means of the conducting needle 202 piercing the connecting plug, and another end of the connector is connected to the conducting wire to realize power supply of the light strip.

The present disclosure embodiment adopts the connection method of the conducting needle 202 piercing the light strip 30 to realize the circuit connection between the light strips, which is more convenient to use; the present disclosure embodiment adopts the method of the connecting plug 10 connecting the light strip 30 and connecting it to the connector 20 to realize the overall connection is more solid, and the connection method is more simple, and it can make the connecting plug 10 and the connector 20 have similar shapes to the light strip 30, so that the light strip 30 is more integral after connection.

Figure 2:
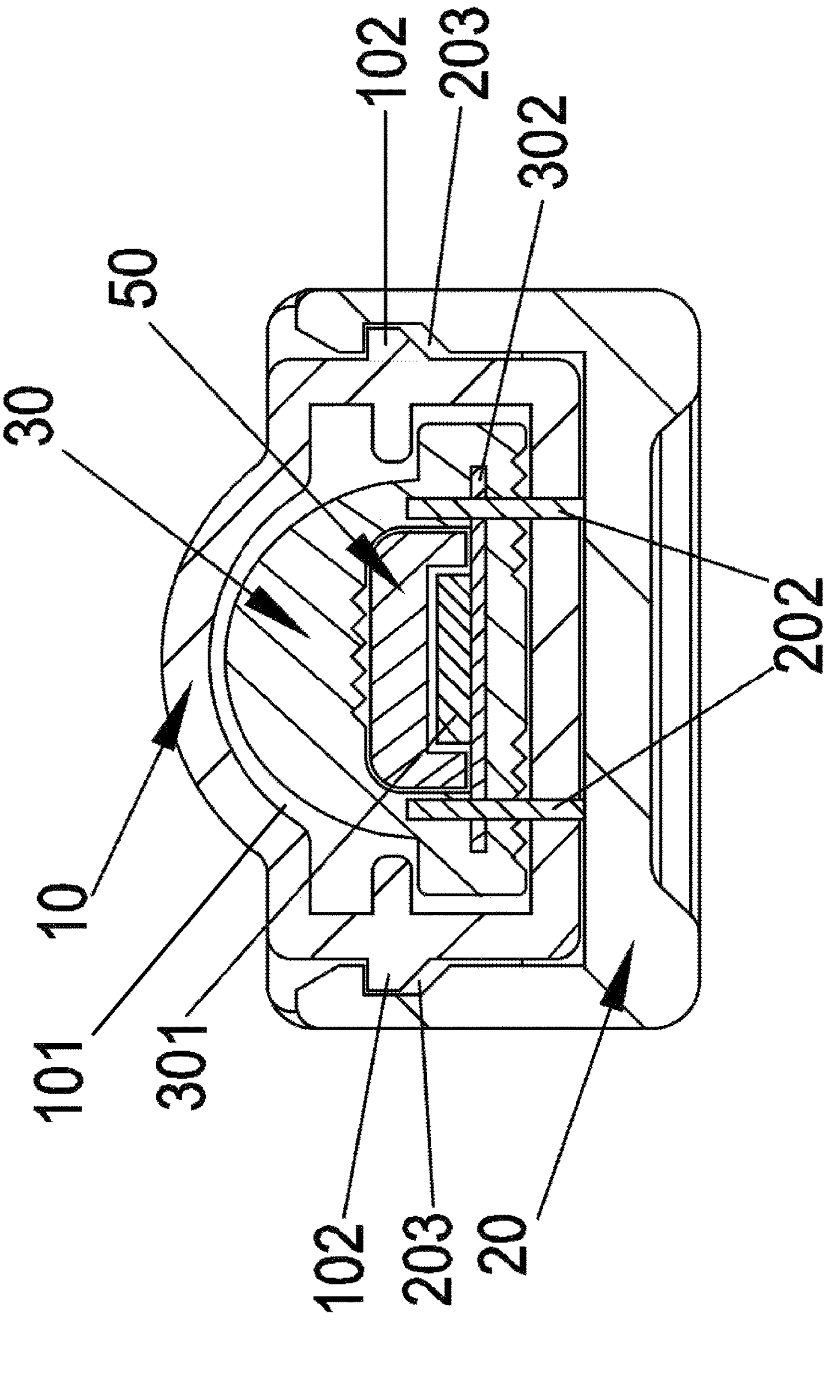
FIG. 2 is a cross-sectional view of the connecting assembly for light strip of the present disclosure embodiment after installation.

In one embodiment, the connecting assembly for light strip 100 further comprises a spacer 50, as shown in FIGS. 1-2, wherein the spacer 50 has a shape matching the shape of the cavity in which the lamp bead 301 of the light strip 30 is located for supporting the circuit board 302 in the light strip 30, wherein the spacer 50 is disposed above the lamp bead for supporting the entire cavity to prevent that in the event that the conducting needle 202 pierces the colloid (gel or glue) of the light strip 30, the upper part of the spacer 50 rests against the upper colloid of the cavity, and the lower part of the spacer 50 rests against the circuit board to prevent deformation of the circuit board 302 towards the cavity.

In one of the embodiments, the outer surface of the connecting plug 10 has a connection structure matching the connector housing; the connection structure can be used to realize the detachable connection of the connecting plug 10 in connection with the connector 20, preferably, the connection structure on the outer surface of the connecting plug 10 is a protrusion 102, and the protrusion 102 is matched with a groove 203 provided on the connector housing 201 to realize the detachable connection of the connecting plug 10 to the connector 20. This can directly realize the connecting plug 10 to be directly snapped and fixed in the connector 20, and at the same time of realizing the snapping, it is also possible to fix the depth of the conducting needle 202 piercing into the light strip 30, so that the conducting needle 202 can have better contact with the circuit board 302 in the light strip 30.

At the same time, the person in the art can, according to the actual situation, set the connection structure on the outer surface of the connecting plug 10 as a groove, and correspondingly set a protrusion on the connector housing 201, so that a match can also be achieved to realize the detachable connection between the connecting plug 10 and the connector 20. In addition, in the embodiments of the present disclosure and other possible embodiments, the person in the art can adopt other alternative connection methods according to the actual needs of the detachable connection of the connecting plug 10 with the connector 20, and can also select different shapes of the grooves and the protrusions in order to realize the mutual matching.

In one embodiment, as shown in FIGS. 1-2, the connector housing 201 has a bottom surface, and the conducting needles 202 are fixedly connected to the bottom surface, wherein the conducting needles 202 can be set up as two groups in order to realize a more solid fixation and the two groups of conducting needles 202 are electrically connected to the bottom surface, preferably, two groups of the conducting needles 202 are connected to the positive pole and negative pole of the power supply respectively, and the conducting wire 40 has two wires for the positive pole and negative pole of the power supply respectively, and the power supply to the circuit board 302 can be realized by the electrical connection of the two groups of conducting needles 202. As a preferred embodiment, the shape of the conducting needle 202 is a Y-shaped needle-prick structure, and the Y-shaped needle-prick structure is that the tip of the conducting needle 202 is divided into two needles, so as to facilitate easier piercing into the colloid and/or the circuit board 302 of the light strip 30 while the conducting needle 202 maintains its rigidity. It can be appreciated by the skilled person in the art that the shape of the conducting needle 202 in the presently disclosed embodiment can be adopted as another shape to facilitate piercing of the light strip 30, and the number of groups of conducting needles 202 is not limited to two, but the conducting needles 202 can also be provided in groups of 3-6 for a more stable fixation, a more reliable electrical connection, or a connection of more circuits in the light strips.

In one embodiment, as shown in FIGS. 1-2, the conducting needles 202 are electrically connected by the connecting plugs 10 piercing and pressing against pads (not shown) on circuit board 302 on light strips 30 threaded through the first hole 101; the circuit boards 302 can be PCB boards, and can be electrically connected by pressing against pads on the PCB boards.

In one embodiment, the conducting needle 202 is electrically connected by the connecting plug 10 piercing the circuit board 302 on the light strip 30 threaded through the first hole 101. Wherein, the circuit board 302 is preferably a flexible circuit board to facilitate piercing to realize electrical connection with the flexible circuit board.

Embodiment 2

According to another aspect of the present disclosure, there is provided a connecting assembly for light strip 200 comprising:

a connecting plug 10 having a first hole 101 that fits the shape of the light strip 30 for connecting the light strip;

A first connector 20 and a second connector 20', both having a connector housing 201 detachably connectable to the connecting plug 10 and a conducting needle 202 for piercing the light strip 30 and realizing an electrical connection with the light strip 30;

A conducting wire 40 for electrically connecting the first connector 20 and second connector 20';

wherein one ends of the first connector 20 and second connector 20' are used to be connected with the light strip 30 by means of the conducting needle 202 piercing the connecting plug 10 respectively, and another ends of the first connector 20 and second connector 20' are connected to the conducting wire 40 to realize power supply of two light strips 30.

The present embodiment is able to realize the connection of two light strips 30 by the conducting wire 40 by means of the above mentioned technical solution, which facilitates the realization of winding turning of the light strips, and obtains a more flexible way of winding the wires, despite sacrificing the continuity of the light strips.

In one embodiment, the connecting assembly for light strip 100 further comprises a spacer 50, as shown in FIGS. 1-2, the spacer 50 has a shape matching the cavity in which the lamp bead 301 of the light strip 30 is located for supporting the circuit board 302 in the light strip 30, wherein the spacer 50 is located above the lamp bead for supporting the entire cavity to prevent that in the event that the conducting needle 202 pierces the colloid (gel or glue) of the light strip 30, the upper part of the spacer 50 rests against the upper colloid of the cavity, and the lower part of the spacer 50 rests against the circuit board to prevent deformation of the circuit board 302 towards the cavity.

In one of the embodiments, the outer surface of the connecting plug 10 has a connection structure matching the connector housing; the connection structure can be used to realize a detachable connection of the connecting plug 10 with the connector 20, preferably, the connection structure on the outer surface of the connecting plug 10 is a protrusion 102, and the protrusion 102 is matched with a groove 203 provided on the connector housing 201 to realize the detachable connection of the connecting plug 10 to the connector 20. This can directly realize the connecting plug 10 to be directly snapped and fixed in the connector 20, and while realizing the snapping, it can also fix the depth of the conducting needle 202 piercing into the light strip 30, so that the conducting needle 202 can have better contact with the circuit board 302 in the light strip 30.

At the same time, the person in the art can, according to the actual situation, set the connection structure on the outer surface of the connecting plug 10 as a groove, and correspondingly set a protrusion on the connector housing 201, so that a match can also be achieved to realize the detachable connection between the connecting plug 10 and the connector 20. In addition, in the embodiments of the present disclosure and other possible embodiments, the person in the art can adopt other alternative connection methods according to the actual needs of the detachable connection of the connecting plug 10 with the connector 20, and can also select different shapes of the grooves and the protrusions in order to realize the mutual matching.

Figure 3:
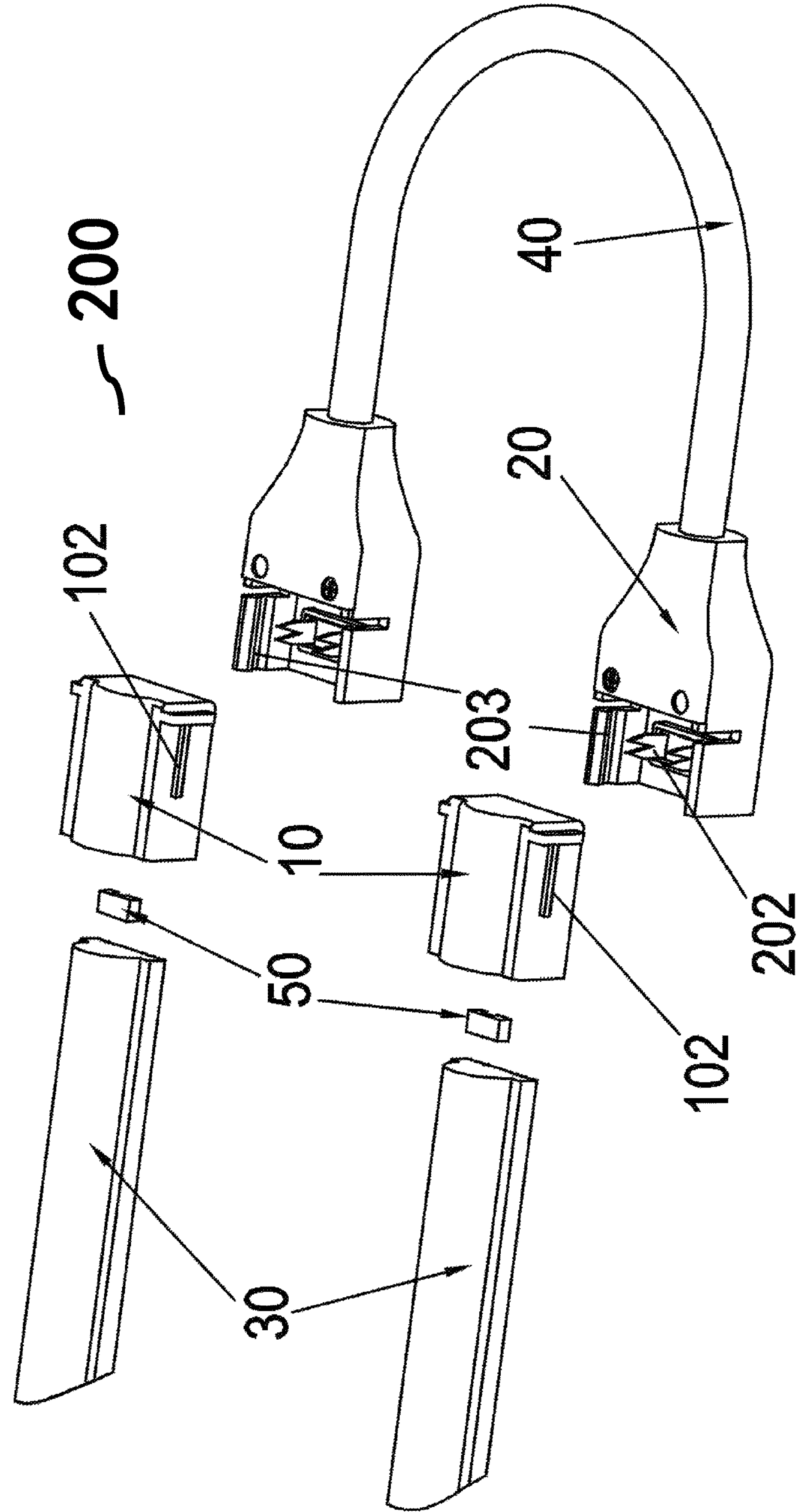
FIG. 3 is a schematic view of the structure of the connecting assembly for light strip 200 of embodiment 2 of the present disclosure.

In one embodiment, as shown in FIGS. 2 and 3, the connector housing 201 has a bottom surface, and the conducting needles 202 are fixedly connected to the bottom surface, wherein the conducting needles 202 can be set up as two groups in order to realize a more solid fixation and the two groups of conducting needles 202 are electrically connected to the bottom surface, preferably, two groups of the conducting needles 202 are connected to the positive pole and negative pole of the power supply respectively, and the conducting wire 40 has two wires for the positive pole and negative pole of the power supply respectively, and the power supply to the circuit board 302 can be realized by the electrical connection of the two groups of conducting needles 202. As a preferred embodiment, the shape of the conducting needle 202 is a Y-shaped needle-prick structure, and the Y-shaped needle-prick structure is that the tip of the conducting needle 202 is divided into two needles, so as to facilitate easier piercing into the colloid and/or the circuit board 302 of the light strip 30 while the conducting needle 202 maintains its rigidity. It can be appreciated by the skilled person in the art that the shape of the conducting needle 202 in the presently disclosed embodiment can be adopted as another shape to facilitate piercing of the light strip 30, and the number of groups of conducting needles 202 is not limited to two, but the conducting needles 202 can also be provided in groups of 3-6 for a more stable fixation, a more reliable electrical connection, or a connection of more circuits in the light strips.

In one embodiment, as shown in FIGS. 2 and 3, the conducting needles 202 are electrically connected by the connecting plugs 10 piercing and pressing against pads (not shown) on circuit board 302 on light strips 30 threaded through the first hole 101; the circuit boards 302 can be PCB boards, and can be electrically connected by pressing against pads on the PCB boards.

In one embodiment, the conducting needle 202 is electrically connected by the connecting plug 10 piercing the circuit board 302 on the light strip 30 threaded through the first hole 101. Wherein, the circuit board 302 is preferably a flexible circuit board to facilitate piercing to realize electrical connection with the flexible circuit board.

Embodiment 3

According to another aspect of the present disclosure, there is provided a connecting assembly for light strip 300 comprising:

A first connecting plug 10, having a first hole 101 that fits the shape of the light strip for connecting the first light strip 30;

A second connecting plug 10', having a second hole (not shown) that fits the shape of the light strip 30 for connecting a second light strip 30';

a connector 20, having a connector housing 201 detachably connecting the first connecting plug 10 and second connecting plug 10', and a first conducting needle 202 and a second conducting needle 202' that pierces the first light strip 30 and the second light strip 30' and realizes an electrical connection with the first light strip 30 and the second light strip 30'.

The present embodiment is able to realize the connection of two light strips 30 by means of an integrally connected connector 20 by the above technical solution, and the connector 20 adopts the same color as the light strip or is transparent in order to realize the continuity of the light strips, and the uniformity of the light emitting.

Figure 4:
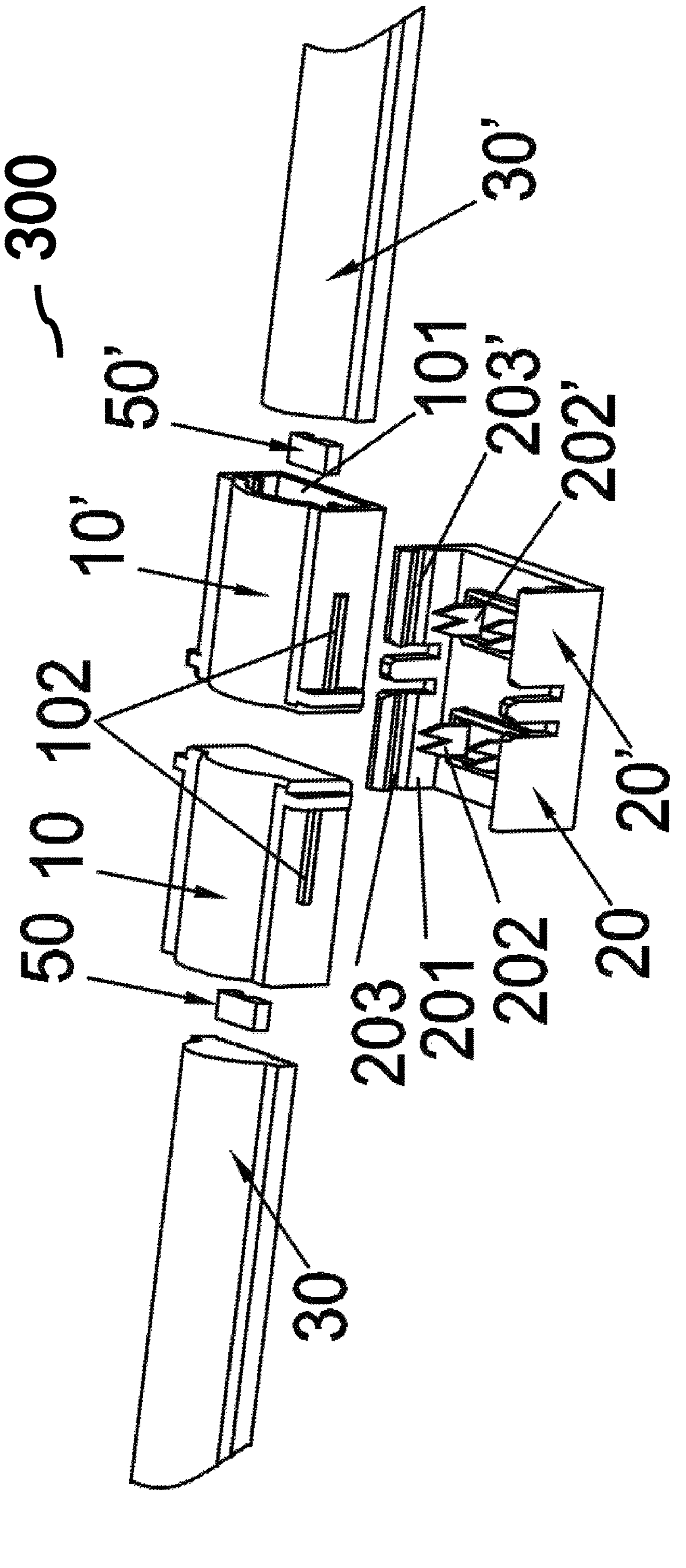
FIG. 4 is a schematic view of the structure of the connecting assembly for light strip 300 of embodiment 3 of the present disclosure.

In one embodiment, as shown in FIGS. 2 and 4, the connecting assembly for light strip 100 further comprises a first spacer 50 and a second spacer 50'; the first spacer 50 and the second spacer 50' both have a shape that matches the cavities in which the light beads of the first light strip 30 and the second light strip 30' are located, for supporting the circuit boards in the first light strip 30 and second light strip 30', for supporting the entire cavity to prevent a deformation of the circuit boards 302 in the direction of the cavity in the event that the conducting needle 202 pierces the colloid of the light strip 30.

In one of the embodiments, the outer surface of the first connecting plug 10 or the second connecting plug 10' has a connection structure matching the connector housing 201; the connection structure can be used to realize a detachable connection of the first connecting plug 10 or the second connecting plug 10' with two ends of the connector 20, preferably, the connection structure on the outer surface of the first connecting plug 10 or the second connecting plug 10' is a protrusion 102, and the protrusion 102 is matched with a groove 203 provided on the connector housing 201 to realize the detachable connection of the first connecting plug 10 or the second connecting plug 10' to two ends of the connector 20. This can directly realize the first connecting plug 10 or the second connecting plug 10' to be directly snapped and fixed to two ends of the connector 20, and while realizing the snapping, it can also fix the depth of the first conducting needle 202 or the second conducting needle 202' piercing into the first light strip 30 and the second light strip 30', so that the first conducting needle 202 or the second conducting needle 202' can have better contact with the circuit board 302 in the first light strip 30 or the second light strip 30'.

At the same time, the person in the art can, according to the actual situation, set the connection structure on the outer surface of the first connecting plug 10 or the second connecting plug 10' as a groove, and correspondingly set a protrusion on the connector housing 201, so that a match can also be achieved to realize the detachable connection between the first connecting plug 10 or the second connecting plug 10' and the connector 20. In addition, in the embodiments of the present disclosure and other possible embodiments, the person in the art can adopt other alternative connection methods according to the actual needs of the detachable connection of the first connecting plug 10 or the second connecting plug 10' with the connector 20, and can also select different shapes of the grooves and the protrusions in order to realize the mutual matching.

In one embodiment, as shown in FIGS. 2 and 4, the connector housing 201 has a bottom surface, and the first conducting needle 202 and the second conducting needle 202' are fixedly connected to the bottom surface, wherein the first conducting needle 202 and the second conducting needle 202' can be set up as two groups in order to realize a more solid fixation and the two groups thereof are electrically connected to the bottom surface; preferably, two groups of the first conducting needle 202 or the second conducting needle 202' are connected to the positive pole and negative pole of the power supply respectively, so as to enable an electrical connection to be realized by the first conducting needle 202 and the second conducting needle 202' piercing the first light strip 30 and the second light strip 30' respectively. As a preferred embodiment, the shape of the first conducting needle 202 and the second conducting needle 202' are a Y-shaped needle-prick structure, and the tip of the Y-shaped needle-prick structure is divided into two needles, so as to facilitate easier piercing into the colloid and the circuit board 302 of the first light strip 30 and the second light strip 30' while the first conducting needle 202 and the second conducting needle 202' maintain their rigidity. It can be appreciated by the skilled person in the art that the shape of the first conducting needle 202 or the second conducting needle 202' in the presently disclosed embodiment can be adopted as another shape to facilitate piercing of the first light strip 30 or the second light strip 30', and the number of groups of the first conducting needle 202 or the second conducting needle 202' is not limited to two, but the first conducting needle 202 or the second conducting needle 202' can also be provided in groups of 3-6 for a more stable fixation, a more reliable electrical connection, or a connection of more circuits in the light strips.

In one embodiment, as shown in FIGS. 2 and 4, the first conducting needles 202 are electrically connected by the first connecting plugs 10 piercing and pressing against pads (not shown) on the circuit board 302 on the first light strips 30 threaded through the first hole 101; the circuit boards 302 can be PCB boards, and can be electrically connected by pressing against pads on the PCB boards.

In one embodiment, the second conducting needle 202' is electrically connected by the second connecting plug 10' piercing the circuit board 302 on the second light strip 30' threaded through the second hole. Wherein, the circuit board 302 is preferably a flexible circuit board to facilitate piercing to realize electrical connection with the flexible circuit board.

Embodiment 4

Figure 5:
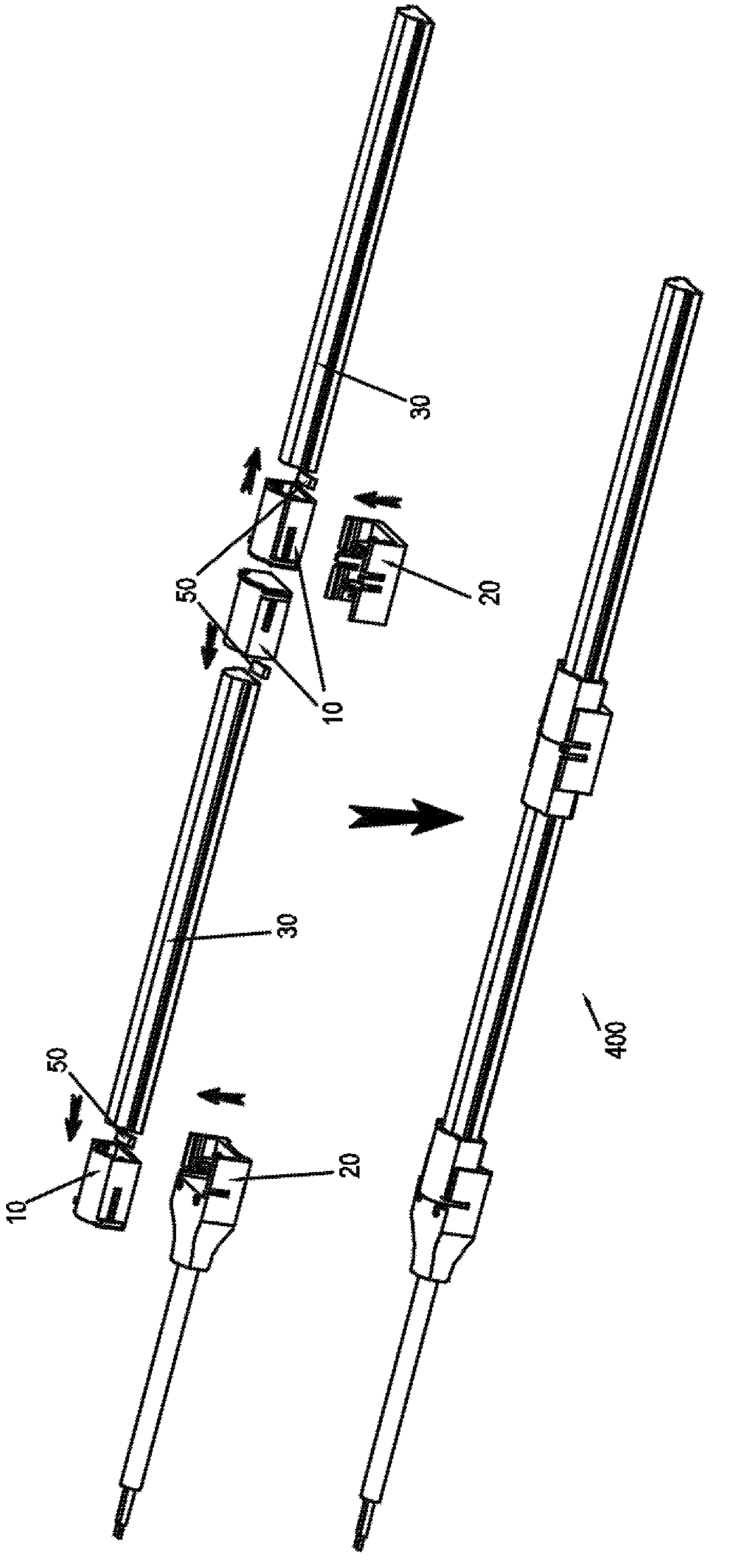
FIG. 5 is a schematic view of a light strip before and after installation of embodiment 4 of the present disclosure.

As shown in FIG. 5, which is a schematic view of the light strip before and after installation of the embodiment of the present disclosure, it can be seen that the embodiments 1, 3 of the present disclosure can be realized by the following way of installation: inserting the spacer 50 into the cavity of the light strip 30; then inserting the light strip 30 into the connecting plug 10; snapping the connecting plug 10, which is connected with the light strip 30, into the connector 20 in order to enable the conducting needles 202 provided on the connector 20 to pierce the light strip 30 to realize the electrical connection. Further, this embodiment discloses a light strip 400 obtained using the above embodiments 1-3.

Figure 6:
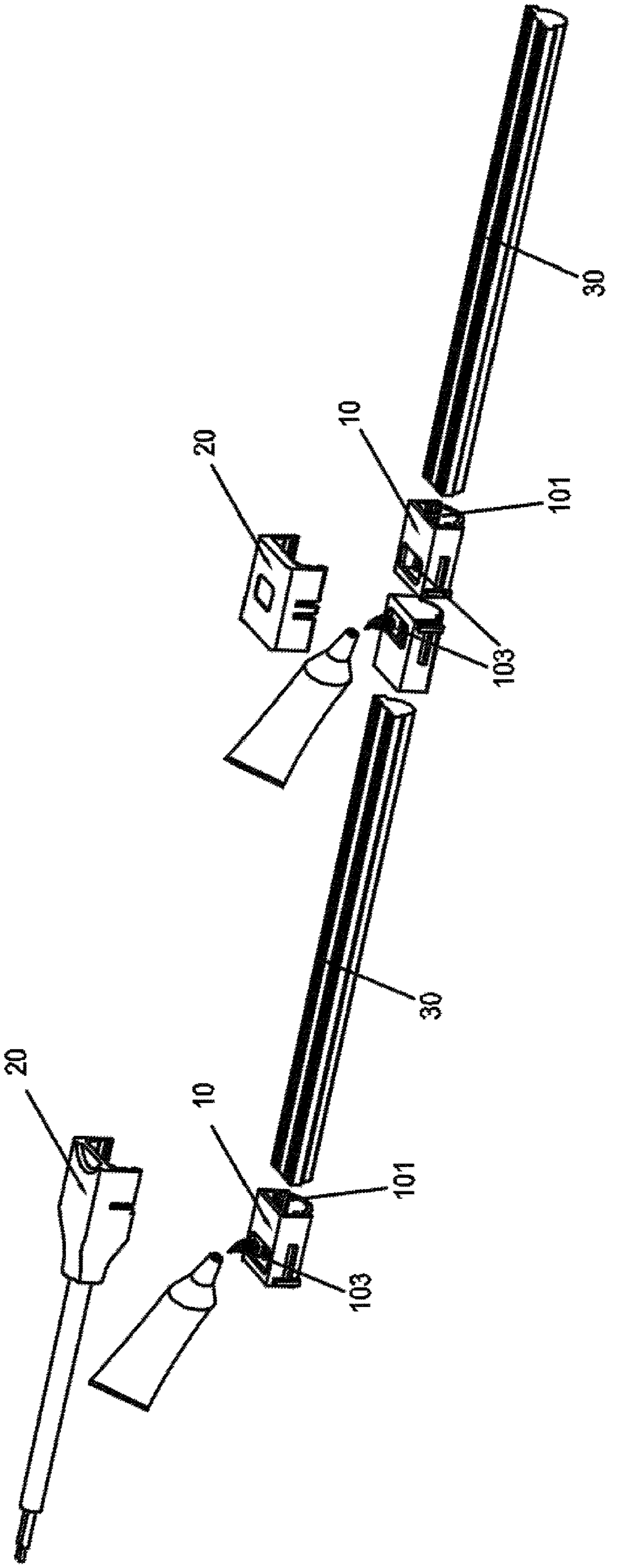
FIG. 6 is a schematic view of the dropping glue of embodiment 4 of the present disclosure.

Preferably, in embodiments 1-3, the back surface of the connecting plug 10 can be provided with a third hole 103 connected to the first hole 101, as shown in FIG. 6, which is a schematic view of the presently disclosed embodiment of dropping glue, the third hole 103 can enable the conducting needle 202 in the connector 20 to pass through in order to pierce into the light strip 30, and can also realize the waterproof function by dropping glue into the connecting plug 10 through the third hole 103. The process of dropping glue into the connecting plug 10 is as follows: flip the connecting plug 10 so that the third hole 103 is facing upward; firstly drop glue into the third hole 103; insert the light strip 30 into the first hole 101 of the connecting plug 10 before the glue solidifies, and push and pull the light strip 30 back and forth a few times so that the glue is evenly distributed, and then insert the light strip to the bottom to realize the installation.

The above mentioned embodiments are only to express the implementation of the present disclosure, the description is more specific and detailed, but not to be construed as a limitation of the patent scope of the present disclosure. It should be pointed out that, for those of ordinary skill in the art, without departing from the conception of the present disclosure, a number of deformations, equivalent substitutions, improvements, etc., can be made, which all fall within the scope of protection of the present disclosure. Therefore, the scope of protection of the presently disclosed patent shall be subject to the appended claims.

The invention claimed is:

1. A connecting assembly for light strip, comprising:

a connecting plug having a first hole suitable for a shape of a light strip for connecting the light strip;

a connector, having a connector housing detachably connectable to the connecting plug, and a conducting needle that pierces the light strip and realizes an electrical connection with the light strip;

a conducting wire, connected to a power source to realize power supply to the light strip;

Wherein one end of the connector is used to be connected with the light strip by means of the conducting needle piercing the connecting plug, and another end of the connector is connected to the conducting wire to realize power supply of the light strip, wherein the connector housing has a bottom surface and the conducting needle is fixedly connected to the bottom surface.

2. The connecting assembly for light strip according to claim 1, wherein it further comprises: a spacer having a shape matching the cavity, in which a lamp bead of the light strip is located, for supporting a circuit board in the light strip.

3. The connecting assembly for light strip according to claim 1, wherein an outer surface of the connecting plug has a connection structure matching the connector housing;

and/or, a back surface of the connecting plug is provided with a third hole connected to the first hole, the third hole is used for the passage of the conducting needle.

4. The connecting assembly for light strip according to claim 3, wherein the connection structure on the outer surface of the connecting plug is a protrusion, the protrusion is matched with a groove provided in the connector housing to realize a detachable connection between the connecting plug and the connector;

or, the connection structure on the outer surface of the connecting plug is a groove, the groove is matched with a protrusion provided on the side face of the connector housing to realize a detachable connection of the connecting plug with the connector.

5. The connecting assembly for light strip according to claim 4, wherein the connector housing has two sidefaces set opposite to each other, and two grooves set on the sidefaces match with two protrusions set on the outer surface of the connecting plug to realize the detachable connection between the connecting plug and the connector;

or, the connector housing has two sidefaces set opposite to each other, two protrusions set on the sidefaces matching two grooves set on the outer surface of the connecting plug to realize the detachable connection between the connecting plug and the connector.

6. The connecting assembly for light strip according to claim 1, wherein the conducting needle pierces into and presses against a pad on a circuit board on a light strip inserted the first hole through the connecting plug to achieve the electrical connection;

or, the conducting needle pierces into a circuit board on a first light strip inserted into the first hole through a first connecting plug to achieve the electrical connection.

7. A connecting assembly for light strip, comprising:

a connecting plug having a first hole that fits a shape of a light strip for connecting the light strip;

a first connector and a second connector, both having a connector housing detachably connectable to the connecting plug, and a set of conducting needles for piercing the light strip and realizing an electrical connection with the light strip;

a conducting wires for electrically connecting the first connector and the second connector;

wherein one ends of the first connector and the second connector are used to be connected with a light strip by means of the conducting needles piercing the connecting plug respectively, and another ends of the first connector and the second connector are connected to each other by the conducting wire to realize an electrical connection between two light strips.

8. A connecting assembly for light strip, comprising:

a first connecting plug having a first hole suitable for a shape of a light strip for connecting a first light strip;

a second connecting plug having a second hole adapted to a shape of the light strip for connecting a second light strip;

a connector, having a connector housing detachably connecting the first connecting plug and the second connecting plug, and a set of first conducting needles and a set of second conducting needles piercing the first light strip and the second light strip and realizing an electrical connection with the first light strip and second light strip, wherein the connector housing has a bottom surface and the conducting needle is fixedly connected to the bottom surface.

9. The connecting assembly for light strip according to claim 8, wherein it further comprises: a first spacer and a second spacer; the first spacer and the second spacer both have a shape that matches a shape of a cavity in which the lamp beads of the first light strip and the second light strip are located, for supporting a circuit board in the light strips.

10. The connecting assembly for light strip according to claim 8, wherein the first conducting needle pierces into a circuit board on the first light strip inserted in the first hole through a first connecting plug to achieve an electrical connection;

and/or, the second conducting needle pierces into a circuit board on the second light strip inserted in the second hole through a second connecting plug to achieve an electrical connection.

11. The connecting assembly for light strip according to claim 8, wherein the first conducting needle pierces into and presses against a pad on a circuit board on the first light strip inserted in the first hole through a first connecting plug to achieve an electrical connection;

and/or, the second conducting needle pierces into and presses against a pad on a circuit board on the second light strip inserted in the second hole through a second connecting plug to achieve an electrical connection.

12. A light strip, wherein a connection in the light strip is realized by using the connecting assembly for light strip according to claim 1.

* * * * *